Figure 3:
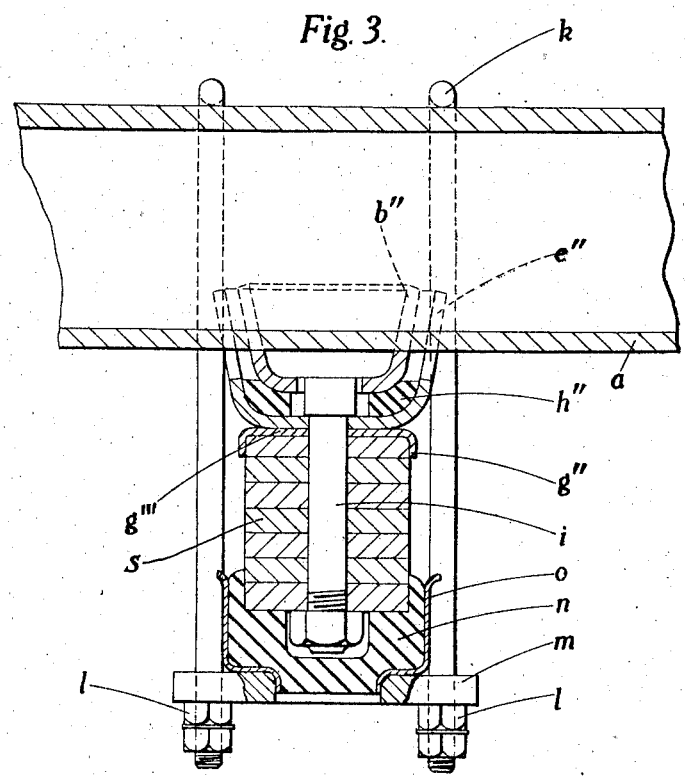

April 21, 1942.  M. OLLEY ET AL  2,280,347
AXLE MOUNTING
Filed July 3, 1940  3 Sheets-Sheet 1
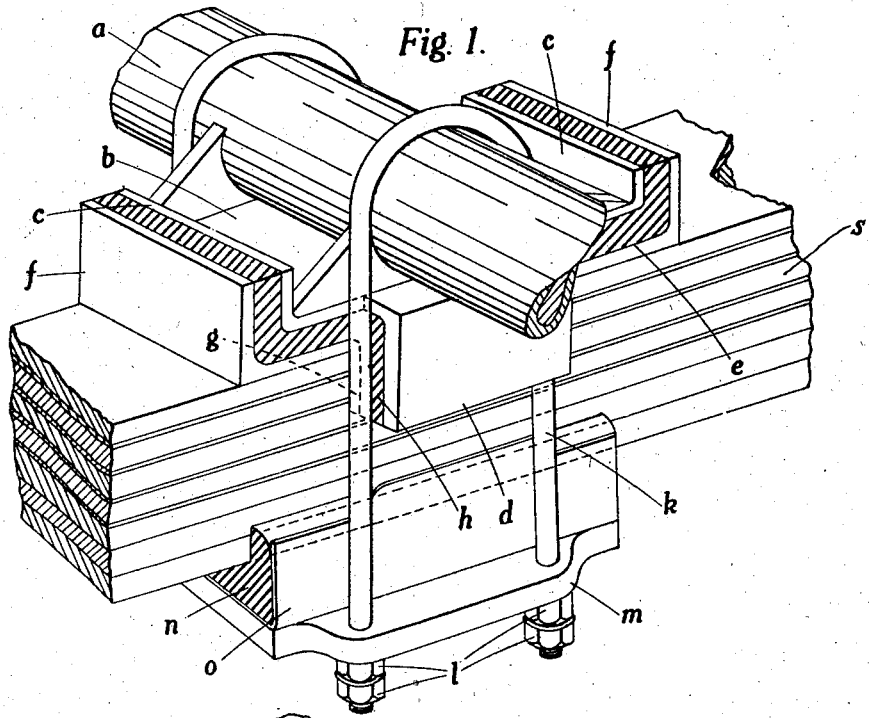
Fig. 1.
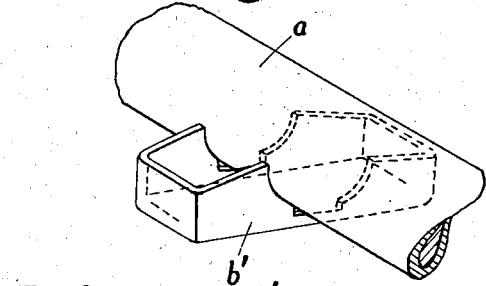
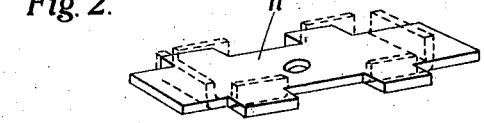
Fig. 2.
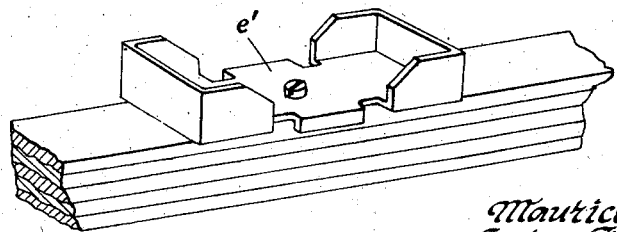
Inventors
Maurice Olley &
George F. Gibson
By Blackmore, Spicer & Flint
Attorneys April 21, 1942.    M. OLLEY ET AL    2,280,347
AXLE MOUNTING
Filed July 3, 1940    3 Sheets-Sheet 3

Inventors
Maurice Olley &
George F. Gibson
By Blackmore, Spencer & Flint
Attorneys Patented Apr. 21, 1942

2,280,347

UNITED STATES PATENT OFFICE 2,280,347

AXLE MOUNTING

Maurice Olley, Detroit, Mich., and George F. Gibson, Luton, England, assignors to General Motors Corporation, Detroit, Mich., a corporation of Delaware Application July 3, 1940, Serial No. 343,806
In Great Britain July 3, 1939

4 Claims. (Cl. 267—52)

This invention relates to vehicle suspension systems and particularly to the manner of connecting an axle to its connecting means with the vehicle body.

The object of the invention is a resilient connection between an axle and its connecting means with the vehicle body which will permit of limited movement therebetween in any direction and particularly fore and aft movements and those which are compounded of a sideways linear movement and a turning movement about a vertical central axis while resiliently resisting such movements and effectively damping undesirable oscillations of the axle relatively to the vehicle body.

Another object of the invention is to prevent the transmission and amplification of disagreeable sounds and noises between the axle and its connecting means to the vehicle body.

A more specific object of the invention is a resilient connection of the foregoing kind between an axle and a load supporting leaf spring forming its connecting means to the vehicle body.

The above and other objects of the invention will be apparent as the description proceeds.

According to the invention, the axle and the spring, constituting its connecting means to the vehicle body, are separated from each other by a pad of resilient material extending between interfitting portions of brackets on the axle and the spring, comprised by longitudinal portions, two end portions, and two side portions on each of the brackets respectively, whereby flexibility is provided for relative motion between the axle and the spring, both transversely and longitudinally, said relative motion being resiliently opposed by the resilient material.

The drawings show three alternative forms of constructions according to the invention. In the drawings:

Fig. 1 is a perspective view of one form.

Fig. 2 comprises perspective views of another form with the parts in separated relationship.

Figure 4:
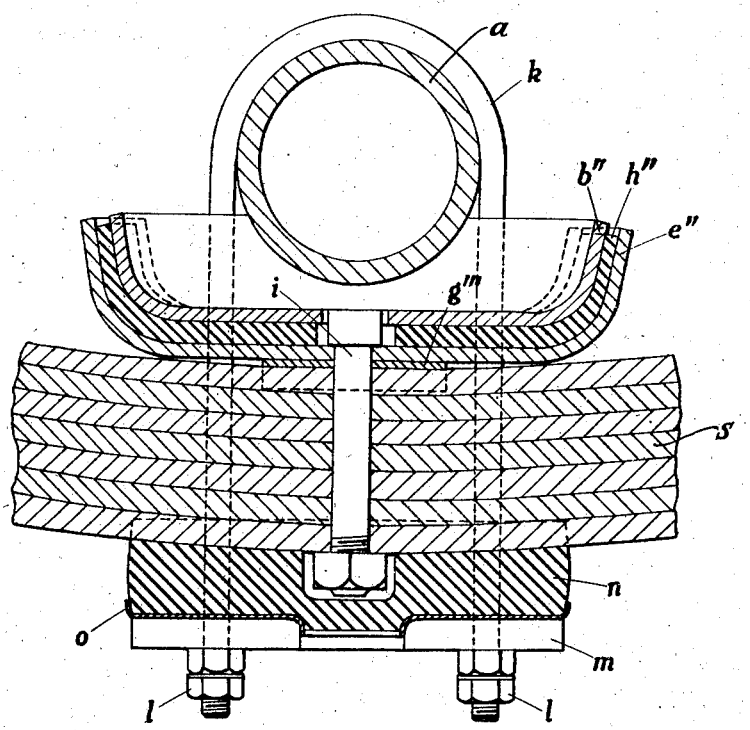
Figure 5:
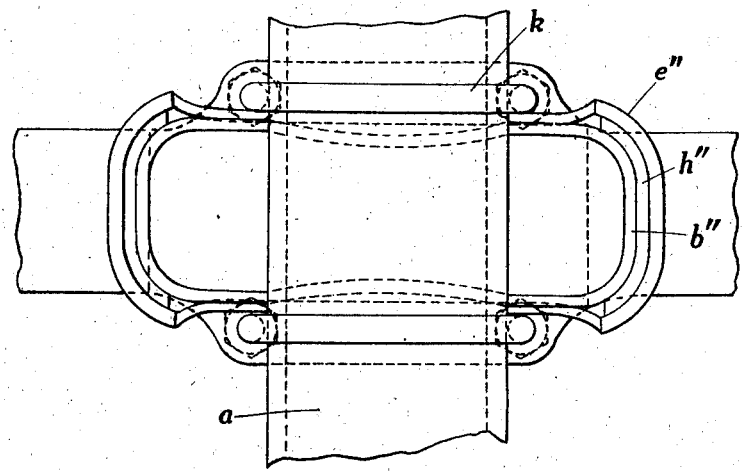

Figs. 3, 4 and 5 are respectively end and side sectional elevations and a plan view of a third embodiment.

Referring now to Fig. 1, the axle $a$ has attached to it a bracket $b$, which may be suitably reinforced as shown and which has upwardly extending end portions $c$ and side portions including downwardly extending lugs $d$. The spring $s$ likewise carries a bracket $e$ which has upwardly extending end portions $f$ and side portions including downwardly extending lugs $g$. The two brackets are mounted in juxtaposition but separated from each other by a pad of rubber or other suitable resilient material $h$ extending between interfitting portions of the brackets comprised by their longitudinal portions, and two end portions and two side portions respectively. The rubber pad $h$, is conveniently cut in one piece from a sheet of suitable thickness and may be bonded to one or both of the brackets $b$ and $e$.

The axle is clamped to the spring by means of inverted U-clamps $k$ at whose ends are nuts $l$ which hold a plate $m$ firmly to the bottom spring leaf with the interposition of another flanged block of rubber $n$, held by a retainer strip $o$.

In Fig. 2, the respective brackets $b'$ and $e'$ are of a box form and the rubber pad $h'$ is also of a different shape to suit the brackets. The rubber pad $h'$ is shown disassembled between the two brackets, the dotted lines indicating its shape when it is in position between the box brackets $b'$, $e'$.

In Figs. 3, 4 and 5, the axle bracket $b''$ is of boat form and fits into the spring bracket $e''$ of similar form, with the rubber pad $h''$ in between. Instead of the lugs $g''$ being formed integrally with the bracket $e$ as shown in Fig. 1, they are formed in this embodiment on a separate plate $g'''$ welded to the bracket $e''$.

In all the embodiments a center bolt $i$ such as that shown in Figs. 3 and 4, passes through the bottom of the bracket $e$ and fits in a hole in the top spring leaf, while the head of the bolt is clear of the rubber pad $h$ and the axle bracket $b$.

It will be seen that in each construction, any relative movement either longitudinal or transverse, between the axle and the spring involves a stressing of the resilient rubber pad. In this way the undesirable oscillations are effectively damped and prevented from building up.

A flexible mounting of the kind described is especially suitable in those cases where controlled flexibility is required between an axle and its supporting means. The relatively wide spacing of the end and side portions of the respective brackets so that the reaction forces of the resilient material have a long moment arm opposing relative turning movement between the axle and its supporting means, insures that the resilient material is not over-stressed while effectively controlling such movements.

We claim:

1. In a motor vehicle, the combination with an axle and a longitudinally disposed load supporting leaf spring, of resilient connecting means between the axle and spring, resiliently opposing relative transverse and longitudinal movement therebetween; said means including, a bracket extending longitudinally of the spring on which it is seated, having side portions including lugs embracing the sides of said spring, and end portions extending in an opposite direction to said lugs, a bracket on the axle with portions interfitting but spaced from the longitudinal, side, and end portions of said first named bracket, and a pad of resilient sheet material interposed between said interfitting portions of said brackets; said interfitting end portions being spaced some distance away from the axle, on opposite sides thereof.

2. The combination according to claim 1, in which the first named bracket is located in position on the spring by a pin secured thereto, which extends into a hole in a leaf of the spring.

3. The combination according to claim 1, in which the brackets are of interfitting rectangular box form.

4. The combination according to claim 1, in which the brackets are of interfitting boat shaped form.

MAURICE OLLEY.
G. F. GIBSON.